US006855776B2

(12) United States Patent
Chao et al.

(10) Patent No.: US 6,855,776 B2
(45) Date of Patent: Feb. 15, 2005

(54) AMINO-TERMINATED POLYBUTADIENES

(75) Inventors: Herbert Shin-I Chao, Paoli, PA (US); John Schmidhauser, Paoli, PA (US); Alain Robert Drexler, Philadelphia, PA (US); Nan Tian, Wilmington, DE (US)

(73) Assignee: Sartomer Technology Company, Inc., Wilmington, DE (US)

( * ) Notice: Subject to any disclaimer, the term of this patent is extended or adjusted under 35 U.S.C. 154(b) by 61 days.

(21) Appl. No.: 10/300,435

(22) Filed: Nov. 20, 2002

(65) Prior Publication Data

US 2003/0096916 A1 May 22, 2003

Related U.S. Application Data

(60) Provisional application No. 60/331,932, filed on Nov. 21, 2001.

(51) Int. Cl.$^7$ .................................................. C08F 8/30
(52) U.S. Cl. ................... 525/333.2; 525/122; 525/131; 525/177; 525/338; 525/378; 525/379; 525/385; 525/911; 528/61; 528/68; 528/211; 528/229; 528/271; 528/339; 528/363; 564/478; 564/479; 564/480
(58) Field of Search ................. 564/478, 479, 564/480; 525/333.2, 122, 131, 177, 911, 338, 378, 379, 385; 528/68, 229, 61, 211, 271, 339, 363

(56) References Cited

U.S. PATENT DOCUMENTS

| 4,658,062 A | | 4/1987 | Hinney et al. | |
|---|---|---|---|---|
| 4,753,991 A | * | 6/1988 | Bronstert | 525/98 |
| 4,791,174 A | * | 12/1988 | Bronstert et al. | 525/274 |
| 4,812,524 A | * | 3/1989 | Baghdachi | 525/194 |
| 4,994,621 A | | 2/1991 | Yeakey | |
| 5,015,773 A | * | 5/1991 | Dobson | 564/474 |

FOREIGN PATENT DOCUMENTS

| GB | 815168 | 6/1959 |
|---|---|---|
| JP | 05353345 | 8/1995 |

OTHER PUBLICATIONS

V. Edward Lindsell and Stephen Tait. Synthesis and Characterization of α, ωandαand–functionalized hydrogenated polybutadienes: telechelic and semi–telechelic amine and phosphite terminated polymers.

* cited by examiner

*Primary Examiner*—Fred Teskin
(74) *Attorney, Agent, or Firm*—Cozen O'Connor, P.C.; Michael B. Fein

(57) ABSTRACT

Improved amine-terminated polybutadienes (ATPBs) having one or two terminal groups of the formula —CHRNH$_2$ wherein R is $C_1$–$C_{20}$ alkyl, are prepared by aminating a secondary hydroxyl-terminated polybutadiene having no ether groups. The ATPBs may be hydrogenated or partially hydrogenated, either prior to or after the animation, to saturate or partially saturate the polymers. Preferred ATPBs are of the formula H$_2$NCHR-(polybutadiene)-CHRNH$_2$ wherein R is $C_1$–$C_{20}$ alkyl. Polyureas, polyurethanes, crosslinked epoxies, polyamides, and other derivatives with improved properties can be prepared from the ATPBs. The resultant derivatives are useful in liquid binders for braking systems, electric potting compositions, coatings, adhesives, sealants, and water proofing membranes, for example.

28 Claims, No Drawings

AMINO-TERMINATED POLYBUTADIENES

CROSS-REFERENCE TO RELATED APPLICATIONS

Benefit of provisional application No. 60/331,932 of Nov. 21, 2001, is claimed.

BACKGROUND OF THE INVENTION

The invention relates to the preparation and use of amino-terminated polybutadienes.

Hydroxyl-terminated polybutadiene (HTPB) and hydrogenated HTPB have been commercially used in applications demanding low temperature flexibility, water resistance, hydrolytic, acid, or base stability, and/or low dielectric constant, for example in adhesives, sealants, coatings, and electrical potting insulation. However, a deficiency of using HTPB and hydrogenated HTPB is often caused by the rather weak nucleophilicity of the hydroxyl group at the chain end, which prevents its incorporation into formulations under commonly used process conditions. For example, the hydroxyl groups are usually not sufficiently reactive with bisphenol A (BPA) epoxy resins to be useful as crosslinkers or flexibilizers. In addition, when preparing electric potting compounds, the reaction rate between the anhydride of maleic anhydride (MA)-modified polybutadiene and the hydroxyl group of HTPB is too slow at room temperature. Also, the curing reaction between the hydroxyl group of HTPB and isocyanate groups in certain polyurethane applications is hindered, or is rendered incomplete, by the presence or other hydroxyl-containing additives which react at a comparable or faster rate.

Since amine groups have higher nucleophilic reactivity, the amine-terminated polybutadiene (ATPB) polymers corresponding to the HTPB polymers would have been preferable, except for the difficulty and expense of prior art methods of preparing ATPB.

Prior methods of preparing amino-terminated hydrogenated polybutadiene polymers (ATPB) have included synthesis from funtionalized initiators and butadiene monomer or by converting hydroxyl-terminated polybutadiene (HTPB) to ATPB by multi-step synthetic pathways.

Lintsell, et al., *Synthesis and characterization of α, ω-and α-functionalized hydrogenated polybutadienes: telechelic and semi-telechelic amine and phosophite terminated polymers*, Polymer, Vol. 38, Number 11, 2835 (1997) disclosed tosylation of primary HTPBs followed by reaction with aniline or n-propylamine or 3-(dimethylamino)-propyl amine. The terminally tosylated HTPBs were reacted with sodium azide in solvent and then hydrogenated to form the α, ω-diamino polymer (ATPB).

Similarly, Hinney et al., U.S. Pat. No. 4,658,062 assigned to Atlantic Richfield Company, disclosed converting liquid primary HTPB polymer such as Poly bd R45-HT brand to produce ATPB via alkane- or arenesulfonate-terminated polybutadiene. Such methods as that of Lintsell, et al., and Hinney, et al. are interesting from an academic standpoint but are too expensive and cumbersome for commercial use.

Yeakey, et al., U.S. Pat. No. 4,994,621 assigned to Texaco Chemical Company, disclosed reacting liquid HTPB polymer such as Poly bd R45-HT brand wherein the hydroxyl groups are primary, with several alkoxy units per hydroxyl group, to produce a secondary hydroxyl-terminated polymer containing ether linkages. The resultant polymers were aminated by reacting ammonia with the hydroxyl groups under reducing conditions provided by hydrogen under pressure to produce a polymer which was essentially primary amine-terminated. The resultant ATPB of Yeakey, et al., was used in the preparation of polyurea foam or polyurea elastomer and to prepare more hydrophobic cured epoxy resin formulations than could be prepared with previous polyamines.

However, such prior art ATPBs suffered from one or more disadvantages. For example, such prior ATPBs containing ether groups were not weatherable and the resultant polyureas, epoxies, and other resins prepared therefrom were also not weatherable in many cases.

It is an object of the present invention to provide ATPBs which enable improved weatherability when reacted with polyisocyanates, epoxies, anhydride functional polymers, phenolics, or multifunctional carboxylic acid or ester derivatives.

It is another object of the invention to provide ATPBs which can be used as flexibilizers, tougheners, or crosslinkers to produce cured resins with improved physical properties versus the prior ATPBs.

SUMMARY OF THE INVENTION

These objects, and others which will become apparent from the following disclosure, are achieved by the present invention which comprises in one aspect compositions comprising amine-terminated polybutadiene polymers having one or two terminal amine groups of the formula —CHRNH$_2$, wherein R is C$_1$–C$_{20}$ alkyl, and having no ether group.

In another aspect the invention comprises a method of preparing amine-terminated polybutadiene polymers having one or two terminal amine groups comprising aminating a secondary hydroxyl-terminated polybutadiene having no ether groups.

In another aspect, the invention comprises the novel amine-terminated polybutadiene polymers having one or two terminal amine groups prepared by the novel method.

The amine-terminated polybutadiene polymers having one or two terminal amine groups can be hydrogenated or partially hydrogenated, either before or after amination, if desired.

A further aspect is a method of imparting improved physical properties to epoxies, anhydride-functionalized polymers, phenolics, multifunctional carboxylic acid or ester derivatives, and the like to flexibilize, crosslink, and/or toughen the resulting polymers by curing the epoxies, anhydride-functionalized polymers, phenolics, or multifunctional carboxylic acid or ester derivatives with the novel ATPBs and/or hydrogenated ATPBs of the invention.

The resulting polymeric compositions and polymers, i.e., polyureas, polyamides, polyamic acids, polyimides, polyurethanes and reaction products with epoxies, phenolics, and anhydrides, are also an aspect of the invention. Such cured polymer products are characterized by exceptional flexibility and toughness. Moreover, the polymers produced with the novel amine-terminated polybutadiene polymers having one or two terminal amine groups possess excellent water resistance and superior, low dielectric properties.

DETAILED DESCRIPTION OF THE INVENTION

The novel amine-terminated polybutadiene polymers of the invention have one or two terminal groups of the formula —CHRNH$_2$, wherein R is C$_1$–C$_{20}$ alkyl, are free of ether groups, and are optionally hydrogenated or partially hydrogenated. R is preferably $C_1$ alkyl. The preferred polymers have two terminal groups and are of the formula $H_2$NCHR-polybutadiene-CHRNH$_2$.

Although various methods of preparation are possible, preferably the amine-terminated polybutadienes are prepared by a process which comprises amination of secondary hydroxyl-terminated polybutadiene having no ether groups. The preferred overall process comprises polymerizing butadiene under anionic polymerization conditions and then terminating polybutadiene anion, (monoanion for monofunctional or dianion for difunctional) polybutadiene by reacting with an alkylene oxide of the formula:

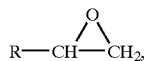

wherein R is a $C_1$–$C_{20}$ alkyl group, in the anionic polymerization medium.

The secondary hydroxyl-terminated polybutadiene having no ether groups is prepared by terminating polybutadiene with an alkylene oxide of the formula

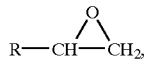

wherein R is a $C_1$–$C_{20}$ alkyl group. The alkylene oxides of such formula result in secondary hydroxyl termination on one or both ends of the polybutadiene. The preferred alkylene oxide is propylene oxide.

Suitable methods for preparing HTPBs having no ether groups and one or two terminal OH groups comprise reacting the alkylene oxide of the formula:

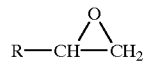

with a monoanion or dianion of polybutadiene prepared by polymerizing butadiene under anionic polymerization conditions, and then quenching the resulting alkoxides with protic compounds, such as water or an acid, for example acetic or phosphoric acid. Preferably as initiator lithium metal is dissolved in solvent, for example in naphthalene, and then the butadiene is added as a liquid, followed by introduction of the alkylene oxide. After the reaction with the alkylene oxide is complete, water is added, resulting in the HTPB having no ether groups.

The amination of the HTPBs having no ether groups can be carried out by any conventional method. The preferred method is by reacting the HTPBs with ammonia in the presence of hydrogen under pressure. A stoichiometric excess of ammonia with respect to hydroxyl groups is preferred. A preferred catalyst for the amination comprises copper, cobalt and/or nickel, and a metal oxide. Suitable metal oxides comprise $Cr_2O_3$, $Fe_2O_3$ $ZrO_2$, $Al_2O_3$, and ZnO. A preferred pressure of hydrogen is over 2 MPa (300 psig), and more preferably about 2.8 MPa (400 psig).

Saturated, i.e., hydrogenated, or partially saturated ATPBs of the invention can be prepared by known hydrogenation methods. The partial or complete hydrogenation of the butadiene backbone can be carried out either before the amination of HTPB step or after the amination step.

The ATPBs of the invention can be reacted with phosgene, diisocyanates or polyisocyanates, or urea to form polyureas. The difunctional ATPBs can also be used as a chain extender during the preparation of water-dispersible polyurethanes. Among other uses the monofunctional ATPBs can be used as chain blocking agents or as grafting agents for modifying oligomers or polymers bearing end- or side-groups, like carboxyls or anhydrides or isocyanates, which can react with amine groups of ATPBs of the invention. Specific bloc or grafted or star type controlled polymeric structures can be obtained by using these ATPBs.

ATPB reacts with epoxies, such as bisphenol A epoxy resins or cylcoaliphatic diepoxides, to form covalent bonds with the epoxy matrix. In such systems the ATPB not only serves as a catalyst, but also a chain flexibilizer in the crosslinked epoxy materials.

The ATPBs react with dicarboxylic acids or derivatives, such as esters and acid chlorides, to form polyamides which reduce the crystallinity and water-absorption of nylons and improve impact resistance of nylons. The polyamide copolymers can be prepared by reacting the ATPB with Nylon or polyesters.

ATPB reacts with dianhydrides to form polyamic acids or polyimides after dehydration. The ATPBs improve the reaction rate of preparing electric potting compounds with MA-modified polybutadiene and the impact resistance of high-temperature polyimides.

ATPB can condense with phenolic compounds via a Mannich-type reaction to serve as a flexibilizer and enhance the electric properties of the resulting phenolic resins.

ATPB can be used as the sole diamine, or in combination with other di- or polyamines in the aforementioned reactions and condensations.

The applications of the materials derived from ATPB include, but are not limited to water-proofing membranes or coatings in the construction industry, adhesives and sealants for housing, road paving, bridges, electronic, automotive, marine and aeronautical applications, electric potting, and liquid binders in brake systems.

Hydrogenated or partially hydrogenated ATPB can be used in the same reactions where ATPB is used. Hydrogenated ATPB in general should render better thermo-oxidative and UV stability to the materials derived therefrom. Applications based on hydrogenated ATPB comprise, but are not limited to, automotive clear/base coats, roof deck coatings, and cable insulation, in addition to the uses described for ATPB.

EXAMPLES

The following examples illustrate a few embodiments of the invention.

Example 1

Preparation of Hydroxyl-terminated Polybutadienes having no Ether Groups

In a 1000 mL three-necked flask were placed 1.04 g (0.15 mole) of lithium metal and 20.2 g (0.16 mole) of naphthalene. The flask was equipped with a dropping funnel having a dry ice-acetone cooling jacket, Teflon-coated magnetic stirrer, and a gas inlet tube. Dry MTBE (t-butyl methyl ether, 900 mL) was added into the flask. The mixture was stirred for 4 hr. at room temperature. Within this period, the lithium disappeared completely. The solution was cooled to −77° C., and 130 g (2.41 mole) of butadiene was introduced into the mixture through the gas inlet tube over 1.5 hr. at the same temperature. After the addition of butadiene, about 15 ml of propylene oxide stored in the dropping funnel was added rapidly into the mixture. The whole solution gelled and decolorized quickly. The flask was allowed to stand in a cooling bath at a temperature below −30° C. overnight, and then brought to room temperature gradually in 10 hrs. All the procedures described above were carried out under argon, and the reactants and reaction mixture were kept from contact with air throughout. The mass was treated with 0.4 g of antioxidant BHT (2,6-di-tert-butyl-4-methylphenol) and 25 mL of water. Addition of water produced a non-viscous solution. After pouring into 2000 mL of water, the separated organic layer was further treated with six successive 1500 mL portions of hot water, at least 1 hr. being allowed for each wash together with efficient stirring. The glycol was separated and heated in a stripper to remove solvents and other volatiles. The product was a viscous liquid hydroxyl-terminated polybutadiene polymer having no ether groups, weighing 120 g.

Example 2

Preparation of Amine-terminated Polybutadienes from Hydroxyl-terminated Butadienes having no Ether Groups This example illustrates the preparation of ATPBs by reductive amination of the HTPBs prepared in Example 1.

The HTPBs prepared in Example 1 were directly reacted with ammonia in the presence of hydrogen in a one-liter autoclave charged with 513 g of the liquid hydroxyl-terminated polybutadiene polymer prepared in Example 1, 50 g of ammonia, and 80 g of a nickel-chromium oxide-copper catalyst, pressurized to 400 psig with hydrogen, then heated to 222° C. and held for one hour.

The theoretical mechanism of the direct reaction is to dehydrogenate the hydroxyl end groups to a ketone, react the ketone with ammonia to form an imine, and then hydrogentation of the imine to the amine. The preferred catalyst system, i.e., nickel-chromium oxide-copper in this example, resulted in high conversions and selectivities. The major side reactions that must be minimized include hydrogenolysis, disproportionation of the amines, and reactions of the intermediates with other amines that could result in dimerizations leading to secondary amine formation. These secondary amine products are reduced by maintaining an excess of ammonia during the reaction.

Various other embodiments, alternatives, and modifications should be readily apparent to those skilled in this art without departing from the spirit and scope of the invention.

What is claimed is:

1. A method of preparing amine-terminated polybutadiene polymers having one or two terminal amine groups comprising aminating a secondary hydroxyl-terminated polybutadiene having no ether groups.

2. The method of claim 1 wherein the secondary hydroxyl-terminated polybutadiene having no ether groups is prepared by polymerizing butadiene under anionic conditions and then reacting an alkylene oxide of the formula:

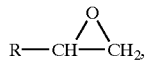

wherein R is a $C_1$–$C_{20}$ alkyl group, in an anionic polymerization medium.

3. The method of claim 2 wherein the alkylene oxide is propylene oxide.

4. The method of claim 2 wherein the secondary hydroxyl-terminated polybutadiene having no ether groups is prepared by reacting propylene oxide with a polybutadiene monoanion or dianion prepared by polymerizing butadiene under anionic polymerization conditions.

5. The method of claim 2 wherein the anionic polymerization medium comprises lithium metal.

6. The method of claim 1 comprising aminating by direct reaction of secondary hydroxyl-terminated polybutadiene having no ether groups with ammonia in the presence of hydrogen.

7. The method of claim 6 wherein a stoichiometric excess of ammonia to hydroxyl groups is provided.

8. The method of claim 7 wherein a catalyst comprising Cu, Co and/or Ni and metal oxide is employed.

9. The method of claim 8 wherein the metal oxide is selected from the group consisting of $Cr_2O_3$, $Fe_2O_3$, $ZrO_2$, $Al_2O_3$, and ZnO.

10. The method of claim 1, further including hydrogenation or partial hydrogenation of the polybutadiene either prior to amination or after amination.

11. An amine-terminated polybutadiene polymer having one or two terminal amine groups prepared by the method of claim 1, wherein the amine-terminated polybutadiene polymer having one or two terminal amine groups is optionally hydrogenated.

12. The amine-terminated polybutadiene polymer of claim 11 wherein the polybutadiene is hydrogenated or partially hydrogenated.

13. An amine-terminated polybutadiene having no ether groups and one or two terminal groups of the formula: —CHRNH$_2$ wherein R is $C_1$–$C_{20}$ alkyl.

14. The amine-terminated polybutadiene of claim 13 wherein R is $C_1$.

15. The amine-terminated polybutadiene of claim 13 having two amine groups and having the formula H$_2$NCHR-(polybutadiene)-CHRNH$_2$, wherein R is $C_1$–$C_{20}$ alkyl.

16. The amine-terminated polybutadiene of claim 15 wherein R is $C_1$.

17. A polymer prepared from a composition comprising an amine-terminated polybutadiene of claim 13.

18. A polyurea prepared by reacting the amine-terminated polybutadiene polymer of claim 13 with phosgene, diisocyanates, or urea.

19. A polyurea prepared reacting the amine-terminated polybutadiene polymer of claim 13 with a polyisocyanate.

20. A cured epoxy article prepared by reacting the amine-terminated polybutadiene polymer of claim 13 with an epoxy resin.

21. A polyamide prepared by reacting the amine-terminated polybutadiene polymer of claim 13 with dicarboxylic acid or dicarboxylic acid ester.

22. A polyamide copolymer prepared by reacting the amine-terminated polybutadiene polymer of claim 13 with a polyamide or a polyester.

23. A polyamic acid or polyimide prepared by reacting the amine-terminated polybutadiene polymer of claim 13 with a dianhydride and dehydrating the resultant compound.

24. A polyimide copolymer prepared by reacting the amine-terminated polybutadiene polymer of claim 13 with a polyimide.

25. A phenolic resin prepared by reacting a phenolic compound via Mannich reaction with the amine-terminated polybutadiene polymer of claim 13.

26. The amine-terminated polybutadiene polymer of claim 13 wherein the polymer is partially hydrogenated or fully hydrogenated.

27. A composition comprising a water-proofing membrane, coating, adhesive, sealant, electric potting compound, or liquid binder for use in a braking system, the composition prepared by polymerizing a composition comprising the amine-terminated polybutadiene polymer of claim 13.

28. A process of flexibilizing, toughening, or cross-linking a cured resin or chain extending polyurethane aqueous dispersion comprising preparing the resin or extending the dispersion with the amine-terminated polybutadiene polymer of claim 13.

* * * * *